United States Patent [19]

Ost, Sr.

[11] Patent Number: 5,602,911
[45] Date of Patent: Feb. 11, 1997

[54] SYSTEM AND METHOD FOR ELIMINATING BELL TAP ON ANALOG TELEPHONES

[75] Inventor: Edwin L. Ost, Sr., Lake Worth, Fla.

[73] Assignee: Siemens Business Communication Systems, Inc., Santa Clara, Calif.

[21] Appl. No.: 59,486

[22] Filed: May 10, 1993

[51] Int. Cl.⁶ .................... H04M 1/00; H04M 3/00; H04M 9/00
[52] U.S. Cl. .................... 379/376; 379/252; 379/377; 379/396; 379/418
[58] Field of Search .................... 379/251, 252, 379/253, 372, 373, 375, 376, 396, 416, 377, 418

[56] References Cited

U.S. PATENT DOCUMENTS

| | | | |
|---|---|---|---|
| 3,662,116 | 5/1972 | Wittman | 379/181 |
| 4,002,837 | 1/1977 | Ebner et al. | 379/377 |
| 4,006,307 | 2/1977 | Danielsen et al. | 379/416 X |
| 4,266,101 | 5/1981 | Dunbar | 379/376 X |
| 4,367,376 | 1/1983 | Proctor et al. | 379/375 |
| 4,533,792 | 8/1985 | Binks et al. | 379/372 |
| 4,823,379 | 4/1989 | Palmer | 379/373 |
| 4,969,186 | 11/1990 | Sayre, II | 379/253 X |
| 4,975,949 | 12/1990 | Wimsatt et al. | 379/387 |

*Primary Examiner*—Thomas W. Brown
*Assistant Examiner*—Harry S. Hong

[57] ABSTRACT

A system and method for modifying a composite Ring AC/Message Waiting (RAC/MW) signal to prevent bell tap on analog telephones. The composite RAC/MW signal comprises AC signals and DC signal alternately spaced in time. At a zero crossover point the composite RAC/MW signal is ramped from a given bias voltage level to a desired Message Waiting voltage level at a slope sufficient to prevent bell tap. Near the end of the Message Waiting portion of the composite signal the composite signal is ramped to the bias voltage level at a slope sufficient to prevent bell tap.

5 Claims, 3 Drawing Sheets

SYSTEM AND METHOD FOR ELIMINATING BELL TAP ON ANALOG TELEPHONES

BACKGROUND OF THE INVENTION

1. Field of the Invention

The current invention relates generally to alarms and signaling apparatuses for generating audio and visual indicators in response to an applied electrical signal, and more specifically, to digital electronic private automatic branch exchanges (EPABX's) with analog telephones which provide a "Message Waiting" feature.

2. Related Art

The current invention is a signal generator for a telephone system, such as a private branch exchange (PBX), which controls operation of audible and visual subscriber station instrument signaling devices.

In such systems a composite signal, comprising audible and visual control signals alternately spaced in time, selectively energizes the ringer or message waiting lamp in subscriber instruments. These audible and visual signals energize ringers and neon lamps respectively at subscriber stations of a PBX via a common bus, to which each station may be selectively connected, via an individual single wire path for each station. The current invention can be utilized with the circuit disclosed in U.S. Pat. No. 4,266,101 to Dunbar, which is hereby incorporated by reference.

A common problem on analog telephones which have the "Message Waiting" feature is "Bell Tap." Bell tap is transient energizing of the ringer which occurs when the message waiting signal is applied and removed.

A discussion of the basic principles of telephone ringers will aid in the understanding of the current invention. Many types and styles of ringers have been developed and placed in service. Some ringers will operate on alternating current only. Others will operate only on ringing current of a special frequency and are known as harmonic ringers. One of the most common is the polarized-biased type. An understanding of the theory of the polarized-biased type will give a working knowledge of practically any other type of ringer.

The polarized-biased ringer is a combination of a permanent magnet and an electromagnet. Ringer coils are wound on iron cores which are securely fastened to only the south pole of the permanent magnet. This combination is known as a ringer solenoid. The north pole of the permanent magnet is supported by the heel plate fastened to the signal case. However, its free end does not come in metallic contact with any of the other parts of the ringer.

By connecting the ringer coils securely to the heel plate, the permanent magnet establishes south poles at the free end of each coil. The armature, to which the clapper arm is attached, is hinged near the north pole of the permanent magnet. This causes the armature to have a north pole at each end while the center is the south pole. Therefore, it can be said the armature is a piece of soft iron with three poles; one at each end, and one in the center inducted by the action of the permanent magnet.

The biasing spring holds the armature nearer to one pole piece than the other. To ring the bells of the ringer it is necessary for the clapper arm to swing back and forth between the two bells. By alternately striking one and then the other in rapid succession a penetrating ringing tone is produced.

If current is caused to flow through the ringers in a certain direction the south pole of the right hand coil will be strengthened considerably and the strength of the left hand coil south pole will be weakened, neutralized, or reversed, depending upon the strength of the energizing current. The armature will be attracted to the right hand coil and repelled from the left hand coil. The effect of the biasing spring will be overcome and the clapper will move to the opposite side and strike the left bell.

When the current is removed from the coils, the magnetic relations in the ringer will return to the original state and the biasing spring will pull the armature back to its original position. In so doing, the clapper will strike the right bell and cause it to ring. If the current impulses energize the coils in rapid succession the bells will continue to ring.

When alternating current (AC) is supplied from the generator, the magnetizing effect of the alternating current will cause the armature to be attracted to first one coil and then the other, without the use of a biasing spring. However, a biasing spring would be necessary to place sufficient tension on the armature to keep the bell from tapping when the line is connected or disconnected from the central office battery. Unfortunately this technique does not always prevent bell tap.

When a pulsating direct current, either positive or negative, is applied to a circuit in which a condenser is in series with a ringer, the alternate charging and discharging of the condenser will cause the ringer to operate. In this instance the energizing effect of the current flowing from the condenser attracts the armature and the biasing spring brings the armature back to normal during the intervals of current flow.

When a common battery system is in use, the ringers on individual lines are connected directly across and the subscriber line is in series with a condenser. The ringing current can be supplied from the central office over the ring side of the line. The circuit is completed over the tip side of the line; hence this circuit is known as a metallic ringing circuit. The condenser opens the line to direct current. Therefore, the circuit for the line battery is not complete until the receiver is removed from the switch hook.

When the telephone is in operation, the ringers are connected across the line. However, their high impedance to the voice current prevents any interference with the operation of the receiver and transmitter. A more complete explanation can be found in Frank E. Lee, *abc of the Telephone*, Vol. 1, pp 40–41, incorporated herein by reference.

In addition to a ringer, some telephones possess a message waiting feature. One technique for implementing this message waiting feature is using a small neon bulb located on the face of the telephone near the rotary dial or dual tone multi-frequency (DTMF) keypad. The lamp flashes on and off to alert the user that a message is waiting for them with a receptionist/operator.

The neon bulb requires a small current and approximately 90 volts to ionize the neon gas in the bulb. This ionization causes the bulb to illuminate. The neon bulb is part of a circuit which allows the necessary voltage to be applied to the neon bulb. This circuit, in analog telephones, is wired in parallel with the audible alerting device, typically a ringer or bell.

The ringer is activated by applying alternating current to it. This current typically has a frequency of 20 hertz. The positive going edge of the Ring AC signal causes the clapper to be attracted to one of the bells in the telephone. Then, as the Ring AC signal becomes negative, the clapper is attracted to the opposite bell. If the attraction is strong enough bell tap occurs.

The Message Waiting signal and the RING signal are sent to the telephone on the same pair of lines, i.e., the RING and TIP lines. A ring relay determines which signal, if any, is sent to the telephone, i.e., either the RING signal, the Message Waiting signal or neither signal. A ring relay is a mechanical relay. Typically, the ring relay is a single pole, double throw relay. It has the capability of connecting a composite Ring AC/Message Waiting (RAC/MW) signal line to one of the subscriber's signal pair, i.e., the TIP or RING signal. The composite RAC/MW signal comprises AC signals and DC signal alternately spaced in time. The precise instant the relay is energized is contingent upon the desired result. If the PBX is trying to alert or "RING" the subscriber's telephone, the relay will be closed at the instant the Ring AC signal begins to appear on the RAC/MW signal line and opened at the instant the Ring AC signal terminates. The Message Waiting signal is unsuitable for ringing the bell because the Message Waiting signal is a direct current (DC) signal. The BELL requires an alternating current signal to sustain an audible ring longer than a single tap.

The requirement for the Message Waiting signal is that it be a direct current signal typically greater than 90 volts. However when the direct current signal is applied to turn on the lamp (rising edge) and when it is removed to turn off the lamp (falling edge), the signal looks to the bell like the beginning and ending of a Ring AC signal. Therefore, the rising edge will cause the clapper to be attracted to one of the bells. When the Message Waiting signal is removed, the collapsing field in the bell coil will cause the clapper to be attracted to the other bell.

U.S. Pat. No. 4,533,792 to Binks et al., herein incorporated by reference in its entirety, describes a process for eliminating some causes of bell tap. Binks requires that the ring relay be closed at the zero crossover point in the Ring AC signal. The Binks patent does not disclose or suggest modifying the combined Ring AC/MW signal. Binks eases the problem of bell tap but does not eliminate it. Modifying the signals is a more reliable method because even when closing the relay at the zero crossover point the rise time of the Message Waiting signal is enough to cause bell tap in some situations. What is needed is a process that works more consistently and which works at the signal level by modifying the ring and Message Waiting signals.

SUMMARY OF THE INVENTION

The current invention is a system and method for modifying a composite Ring AC/Message Waiting (RAC/MW) signal. The composite RAC/MW signal comprises AC signals and DC signal alternately spaced in time. A microprocessor controls a means for generating an AC signal and a DC signal. The microprocessor determines when a Ring AC (RAC) cycle is complete. When this occurs the microprocessor waits until the AC signal is at its zero crossover point before ending the RAC cycle. At this zero crossover point the microprocessor ramps the signal from a given bias voltage level to the desired Message Waiting voltage level so as to prevent bell tap. The microprocessor similarly ramps the signal from the Message Waiting voltage level to the given bias voltage level when the Message Waiting cycle is complete.

BRIEF DESCRIPTION OF DRAWINGS

The foregoing and other objects, features and advantages of the invention will be apparent from the following more particular description of the preferred embodiments of the invention, as illustrated in the accompanying drawings, wherein.

DETAILED DESCRIPTION OF THE PREFERRED EMBODIMENTS

In order to incorporate a message waiting light with a ringer in an analog telephone it is necessary to apply two signals to the telephone line, a ringing signal and a Message Waiting signal.

In the preferred embodiment of the current invention the ringing signal is an alternating current (AC) signal. This signal closely resembles a 20 Hz sinusoidal wave at a potential of approximately 90 VRMS. This signal need not be a perfect sinusoidal, since it may be produced by a means other than a rotating generator.

The Message Waiting signal is a direct current (DC) signal and must have a potential great enough to ionize the gas in a neon bulb. This ionization occurs when the potential applied is approximately 90 volts. Typically the potential is on the order of 100–130 volts.

Figure 2:
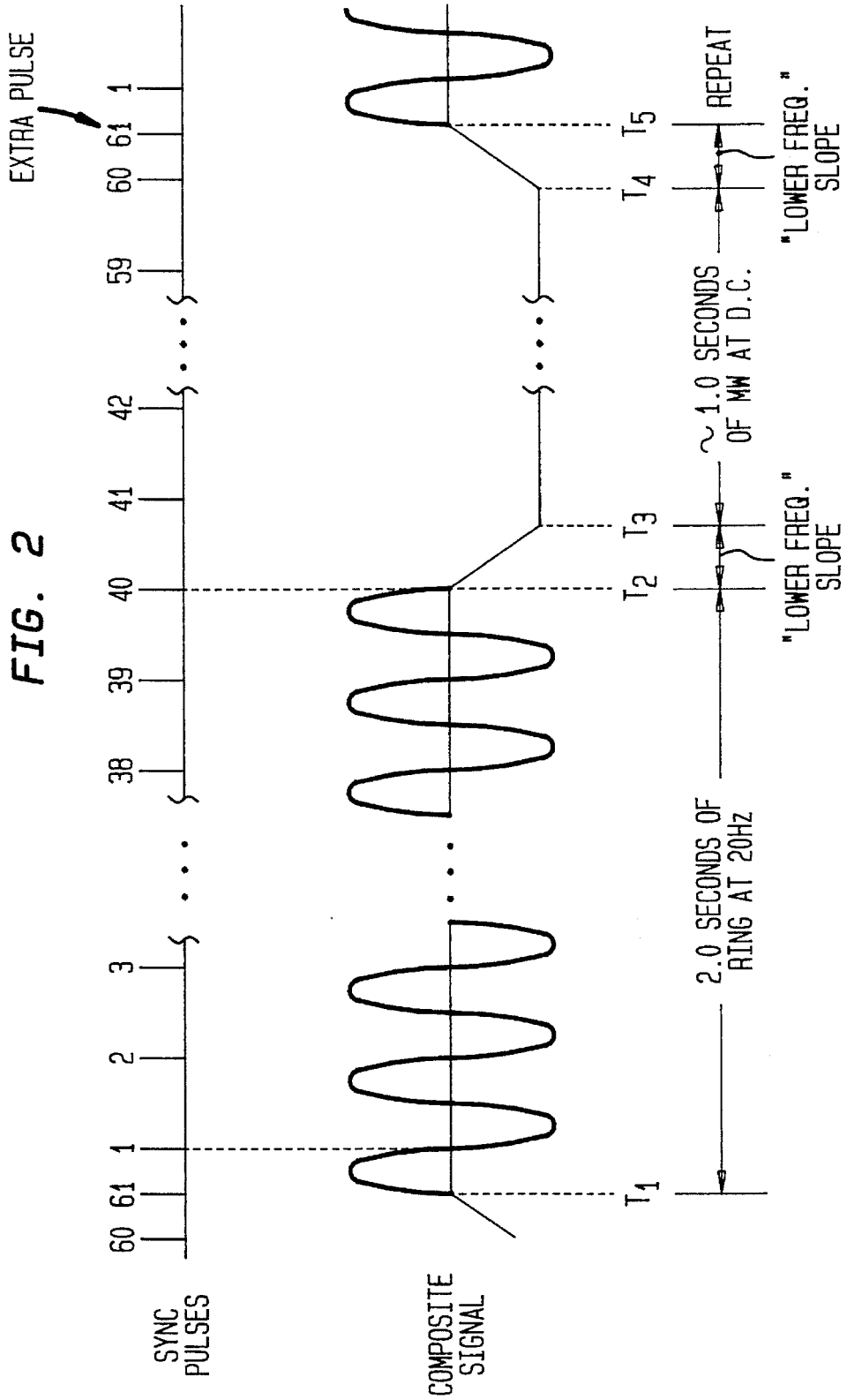
FIG. 2 is an illustration of the RAC/MW signal resulting from the current invention.

Both signals are delivered to the subscriber line control circuit (SLCC) 106 on the same wire. That is, they time share the RAC/MW signal line. What this means is that the Ring AC signal (RAC signal) is on the line for approximately two seconds and the Message Waiting signal (MWS) is on the line for approximately one second as shown in FIG. 2. It would be obvious to one of ordinary skill in this art to adjust the period each of these signals spends on-line.

It is the responsibility of the individual subscriber line circuits to make the connection from the signal line to the telephone line at the proper moment in order to deliver either the RING signal or the Message Waiting signal. In the preferred embodiment, this is accomplished by a subscriber line control circuit which controls a ring relay.

In the Binks '792 patent, the Ring AC signal and the Message Waiting signal are not modified. Instead Binks requires that when the RING relay closes and applies the Message Waiting signal to a telephone line, the RING signal is at a bias voltage. Therefore, there is no sudden sharp edge being applied to the ringer solenoid when the Ring AC signal concludes. The signal the ringer solenoid sees is the normal third quarter portion (180–270 deg.) of a 20 Hz sinusoidal wave.

The current invention requires that the transition from the Ring AC to the Message Waiting signal occur at the zero crossover point. If the RING relay were to be closed after the telephone line signal already transitioned to the approximately −128 VDC message waiting voltage and therefore not at the zero crossover point, the bell ringer would see an instant change to −128 VDC. The rate of change of this signal (dv/dt) would be so high as to be able to build a magnetic field in the ringer solenoid large enough to attract the clapper one time, thereby dinging the bell. This dinging of the bell is bell tap. Some analog telephones have built in protection against this. This protection is achieved by biasing the clapper more toward one bell than a second bell. The TIP and RING line polarity is then selected which cuts down on bell tap. A drawback to this technique is that bell tap is not eliminated on all telephones utilizing this technique. Complete elimination of the problem has not occurred because inside the telephone when two bells are in close proximity to one another with a clapper positioned between them, the rising edge of the Ring AC signal causes the clapper to be attracted to one of the bells. The falling edge of the signal causes the clapper to be attracted to the other bell. If the clapper is physically biased away from one bell, it is more sensitive to tapping the other bell.

The current invention modifies the composite Ring AC/MW signal before the signal is applied to either the TIP or RING line. The normal negative going edge of the third quarter sinusoidal signal has a fast enough transition to cause bell tap in some telephones. Therefore, in order to solve this problem and to make it irrelevant as to whether or not the telephone has built-in protection, the current invention modifies the RAC/MW signal.

Figure 1:
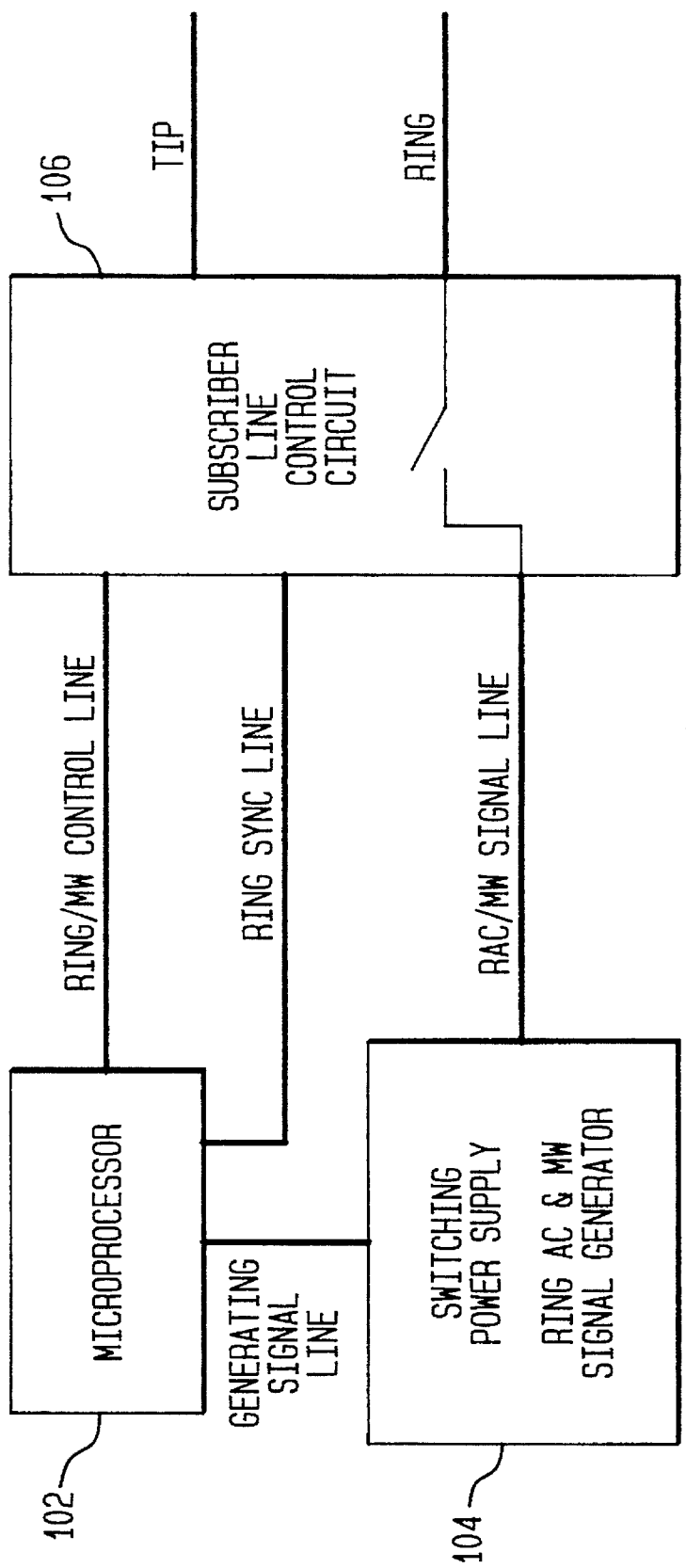
FIG. 1 is an illustration of a bell tap elimination system as described in the disclosure.

Referring to FIG. 1, a microprocessor 102 is coupled to a switching power supply 104 and a subscriber line control circuit 106. The microprocessor 102 sends a generating signal to the switching power supply 104 over the generating signal line. The generating signal is interpreted by the switching power supply 104. As a result the switching power supply 104 continuously outputs a RAC/MW signal. If a RING signal of the composite signal is to be generated the microprocessor 102 sends a signal to the switching power supply 104 over the Generating Line Signal. The switching power supply 104 responds by generating a Ring AC signal on the RAC/MW signal line. The microprocessor 102 controls the switching power supply 104. When a Message Waiting signal of the composite signal is to be generated the microprocessor 102 sends the appropriate signal to the switching power supply 104 to control the voltage on the RAC/MW signal line. If a RING signal or a Message Waiting signal is to be sent to the telephone the microprocessor 102 additionally outputs a signal onto the RING/MW control line which indicates to the subscriber line control circuit 106 that such a signal is to be sent to the telephone.

Figure 3:
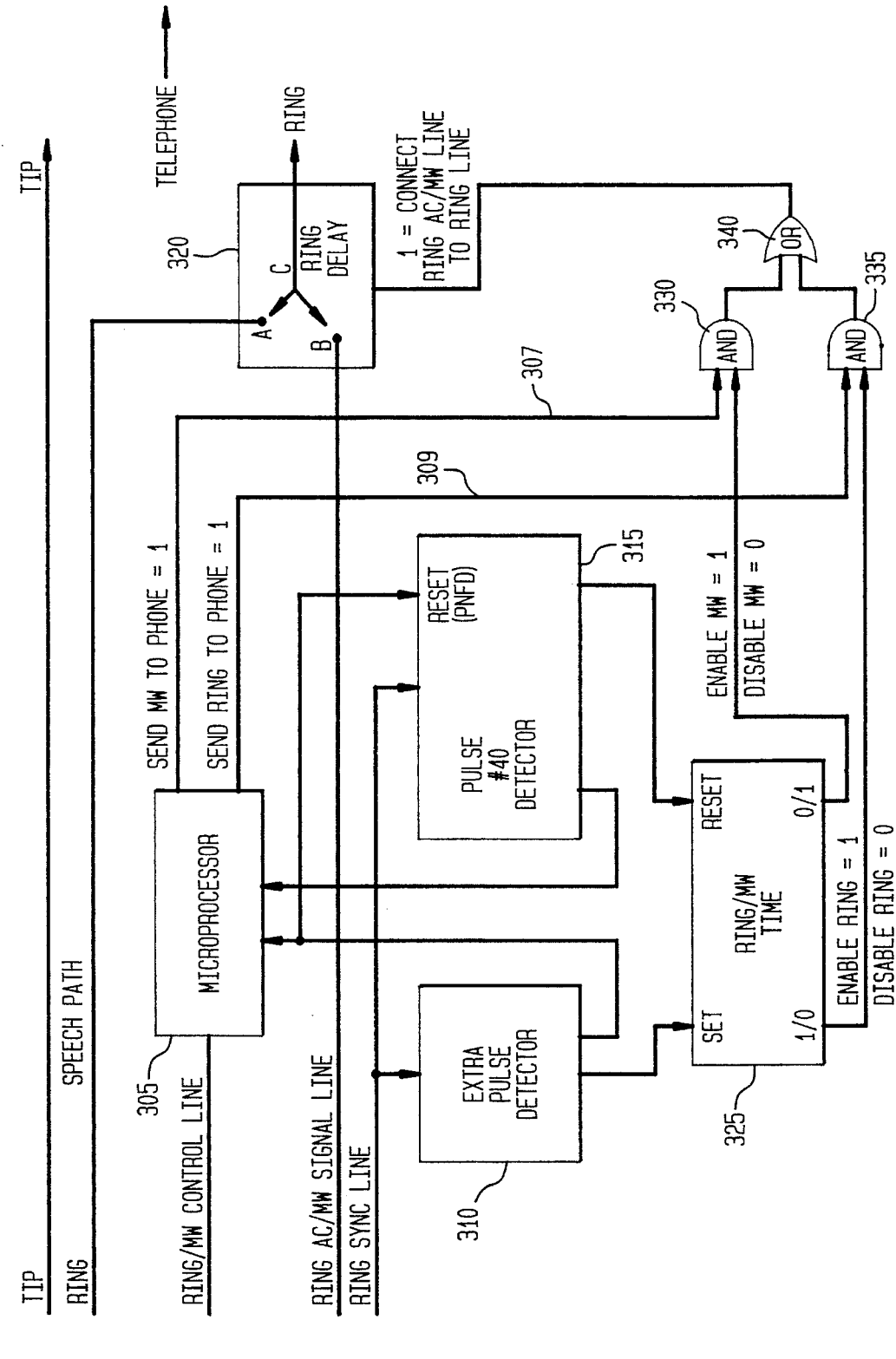
FIG. 3 is an illustration of the subscriber line control circuit.

As shown in FIG. 1, the subscriber line control circuit 106 receives signals over (1) the RING/MW control line, (2) the RING SYNC line, and (3) the RAC/MW signal line. The subscriber line control circuit 106 is shown in greater detail in FIG. 3. FIG. 3 is discussed below. Within the subscriber line control circuit 106 is a ring relay. Typically, the ring relay is a single pole, double throw relay. It has the capability of connecting the RAC/MW signal line to one side of the subscribers signal line pair, i.e., the TIP or RING signal line. In the current invention, either the TIP or RING signal line may be energized without any comparative reduction in performance. The precise instant the relay is energized is contingent upon the desired result. When trying to alert or "RING" the subscribers telephone, the ring relay 106 will be closed at the instant the Ring AC signal begins to appear on the RAC/MW signal line and opened at the instant the Ring AC signal terminates. There are many possible methods for determining when the Ring AC and Message Waiting signals begin and end. It would be obvious to one skilled in the relevant art to use a method different from the method discussed below for determining when the Ring AC and the message waiting portion of the combined signal begin and end. In the preferred embodiment the subscriber line control circuit 106 knows when to begin and end each portion of the signal because the microprocessor 102 provides a sync pulse on the RING SYNC line once per signal cycle at a zero crossover point as shown in FIG. 2. In addition an "extra" sync pulse is generated every three seconds, e.g., time $T_5$. When generating a signal at 20 Hz the sync pulses occur 50 milliseconds (ms) apart. This extra sync pulse occurs only 25 ms after the previous sync pulse. The extra sync pulse is utilized by the subscriber line control circuit 106 which is described below.

An example of the RAC/MW signal generated by the switching power supply 104 is shown in FIG. 2. The Ring AC signal is not modified by the current invention during the ring cycle, times $T_1$ through $T_2$. Immediately preceding the moment when the message waiting cycle begins, the microprocessor 102 determines when the voltage on the RAC/MW signal line is equal to the bias voltage, i.e., the zero crossover point. In the preferred embodiment, the microprocessor 102 will also require that the Ring AC signal be at the beginning of the normal third quadrant, i.e., 180 deg. of a 20 Hz sinusoidal wave, as shown at time $T_2$. At time $T_2$ the rate of voltage change in the Ring AC signal is negative. Another embodiment has the RING cycle concluding at the beginning of the normal first quadrant, i.e., 360 deg. of a 20 Hz sinusoidal wave, i.e, when the rate of voltage change in the Ring AC/MW signal is positive. When the RAC/MW signal voltage is equal to the bias voltage, the message waiting cycle begins. During the Ring AC cycle and the message waiting cycle the microprocessor 102 may output at least three signals: (1) to the subscriber line control circuit 106 over the RING/MW control line, if a Message Waiting signal or a Ring AC signal should be sent to the telephone; (2) sync pulses to the subscriber line control circuit 106 over the RING SYNC line; and (3) to the switching power supply 104 on the generating signal, line causing the switching power supply 104 to generate the composite Message Waiting/Ring AC signal on the RAC/MW signal line. This generating signal is constantly sent to the switching power supply.

A major aspect of the current invention occurs when it is time for the microprocessor 102 to produce the Message Waiting signal, e.g., at time $T_2$. At this time the microprocessor 102 allows more time for the negative going transition to reach the full negative voltage than the Ring AC signal would take, i.e., times $T_2$ through $T_3$. This effectively changes the frequency of the signal being applied to the ringer solenoid. The frequency is effectively changed because the dv/dt of the transition between times $T_2$ and $T_3$ is equal to the dv/dt of a signal with a lower frequency than the Ring AC signal. The ringer solenoid is less efficient at lower frequencies. Therefore, the magnetic field produced by the change in frequency is not large enough to attract the clapper. The result of this lower magnetic field is that the clapper will not ding the bell. The same precaution is taken when removing the Message Waiting signal. If the relay were to be opened while the signal is still at the −128 VDC level, the collapsing magnetic field causes the clapper to be attracted to the opposite bell thereby dinging the opposite bell. In the current invention, before the end of the message waiting time period, times $T_4$ through $T_5$, the signal is returned to the bias level at the same slow rate of change as was used to take it down to −128 VDC. At the bias level, the relay is opened and the cycle is complete. Although in the preferred embodiment the microprocessor 102 generates the same absolute value of the rate of voltage change (dv/dt) to be used at the beginning and the end of the message waiting cycle, these values need not be equal to each other. The only requirement is that the microprocessor 102 choose two rate values such that the absolute value of each rate of voltage change be low enough to prevent bell tap.

If it is necessary to send a Message Waiting signal, to the telephone the microprocessor 102 orders the subscriber line control circuit to connect the RAC/MW signal line with the RING line during the message waiting cycle, $T_2$ through $T_5$. If it is necessary to send a RING signal is to the telephone the microprocessor 102 orders the subscriber line control circuit to connect the RAC/MW signal line with the RING line during the RING cycle, $T_1$ through $T_2$. A possible design for the subscriber line control circuit which allows it to connect the RAC/MW signal line with the RING line is shown in FIG. 3. FIG. 3 shows the preferred embodiment of the subscriber line control circuit 106 in greater detail. It would be obvious to one having ordinary skill in the art to design the subscriber line control circuit differently to achieve the same goal. The subscriber line control circuit inputs a signal on the RING/MW Control Line from microprocessor 102. Inside the subscriber line control circuit another microprocessor 305 interprets this RING/MW Control Line signal and if appropriate generates a signal on line 307 indicating that a message waiting signal should be sent to the telephone, or generating a signal on line 309 indicating that a Ring AC signal should be sent to the telephone.

Microprocessor 102 generates sync pulses as described previously. An extra sync pulse, i.e., sync pulse number 61 in FIG. 2, is generated every three seconds in the preferred embodiment. The extra sync pulse then enters the subscriber line control circuit 106. The Extra Pulse Detector 310 detects this extra sync pulse. The Extra Pulse Detector 310 has an output coupled to the RESET input of a Pulse Number Forty Detector (PNFD) 315. When an extra pulse is detected the Extra Pulse Detector 310 outputs a signal to the PNFD 315. When receiving this signal the PNFD 315 resets an internal Sync Pulse Counter (not shown) to zero. In addition when detecting an extra sync pulse the Extra Pulse Detector 310 sends a signal to a SET input of a Ring/MW Time element 325. The PNFD 315 is coupled to the Ring Sync Line. The PNFD 315 counts the number of sync pulses on the Ring Sync Line. When the PNFD detects the fortieth sync pulse it outputs a signal to the RESET input of the Ring/MW Time element 325. The outputs of the RING/MW Time element 325 are sent to two AND gates 330, 335. AND gate 330 has an additional input coupled to line 307. AND gate 335 has an additional input coupled to line 309. The outputs from these two AND gates 330, 335 indicate whether the signal currently on the Ring AC/MW Signal Line is to be sent to the telephone via the RING line. To this end the outputs from AND gates 330 and 335 are input into OR gate 340. The output of OR gate is coupled to the Ring Relay 320. When the output of OR gate 340 is high the Ring Relay 320 is closed, i.e., node C is connected to node B. When the Ring Relay 320 is closed the signal on the Ring AC/MW Signal Line is sent to the telephone via the RING line. In the preferred embodiment all of the functions performed by all elements, with the exception of the Ring Relay 320, shown in FIG. 3 are performed by the microprocessor 305.

While the invention has been particularly shown and described with reference to a preferred embodiment thereof, it will be understood by those skilled in the art that various change in form and details may be made therein without departing from the spirit and scope of the invention.

What is claimed is:

1. A device for generating a signal for use in a telephone system, the signal comprising one or more AC cycles and one or more DC cycles, being biased by a bias voltage, comprising:

a first means for generating an AC signal;

a second means for generating a DC signal; and a third means, controlling said first and second means, for producing a composite ac/dc signal, comprising said AC signal and said DC signal alternately spaced in time, said third means comprising:

a fourth means for determining when one of the AC cycles is complete;

a fifth means, coupled to said fourth means, for determining when a voltage of said AC signal is equal to the bias voltage when said AC cycle is complete;

a sixth means, coupled to said fifth means, for generating a portion of said composite signal from the bias voltage level to a DC voltage level with a first overall slope, the absolute value of said first slope being less than the maximum absolute value of the slope of said AC signal; and a seventh means, coupled to said sixth means, for generating a portion of said composite signal from said DC voltage level to the bias voltage level, with a second overall slope, the absolute value of said second slope being less than the maximum absolute value of the slope of said AC signal.

2. The device of claim 1, wherein said third means is a microprocessor.

3. The device of claim 1, further comprising a timing means, coupled to said third means, for outputting said composite signal to a subscriber's signal line.

4. A method of generating a signal for use in a telephone system, comprising the steps of:

(1) generating an AC signal;

(2) determining a first time T1 when a voltage of said AC signal is equal to a given bias voltage when a ring cycle is complete;

(3) ramping said AC signal from said bias voltage level, beginning at said time T1, to a DC voltage level at a slope whose absolute value is less than the maximum absolute value of the slope of said AC signal;

(4) generating a DC signal and determining a second time T2 when a message waiting cycle is complete; and (5) ramping from said DC signal from said DC voltage level, beginning at said time T2, to said bias voltage level at a slope whose absolute value is less than the maximum absolute value of the slope of said AC signal.

5. The method of claim 4, further comprising the step, subsequent to step (5) of:

(6) repeating steps (1) through (5) as necessary.

\* \* \* \* \*